June 12, 1923.
J. M. YOUNG
1,458,456
TAKE-OUT AND STEADYING DEVICE FOR GLASS BLOWING MACHINES
Filed April 26, 1920
3 Sheets-Sheet 1
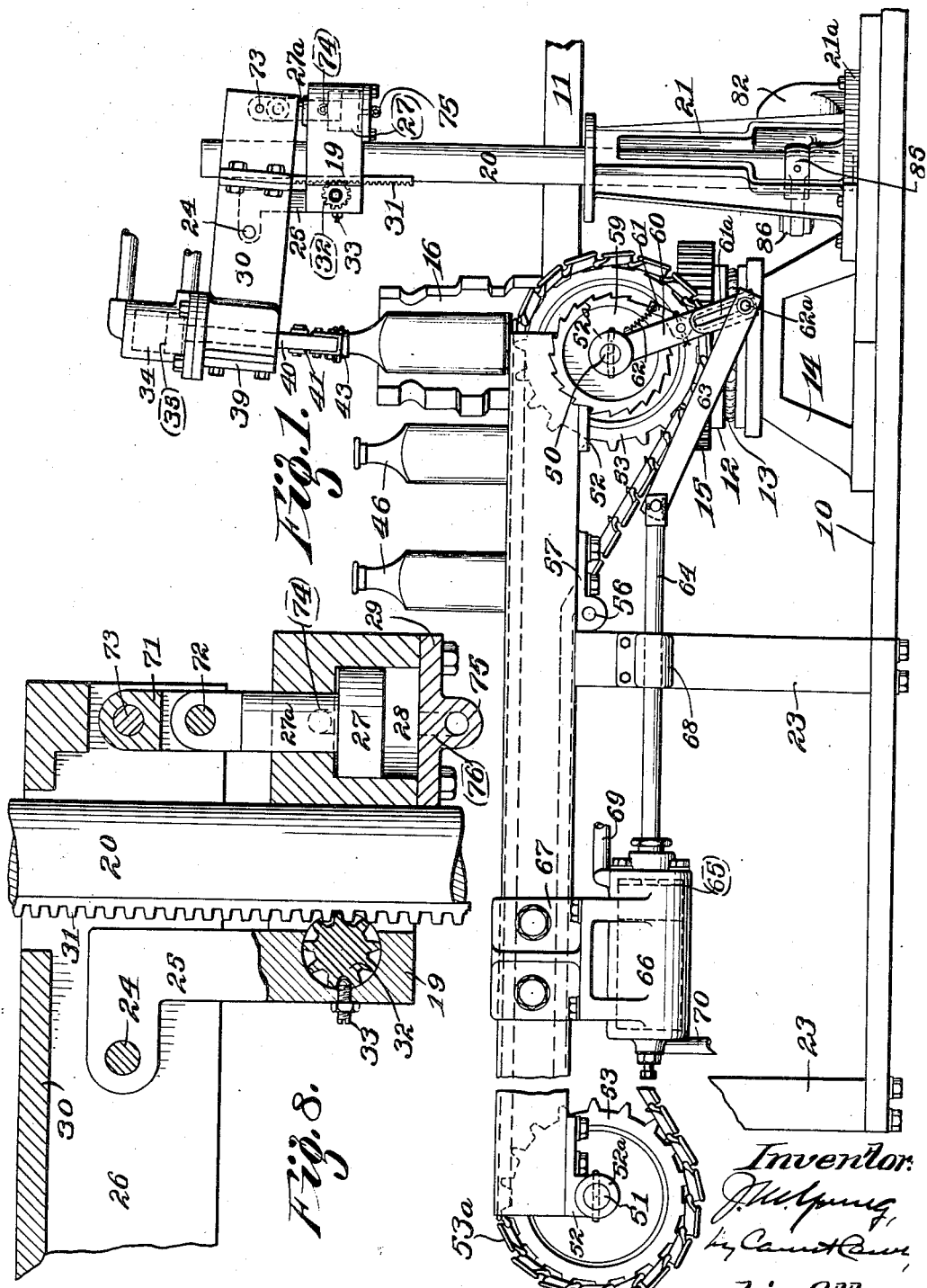

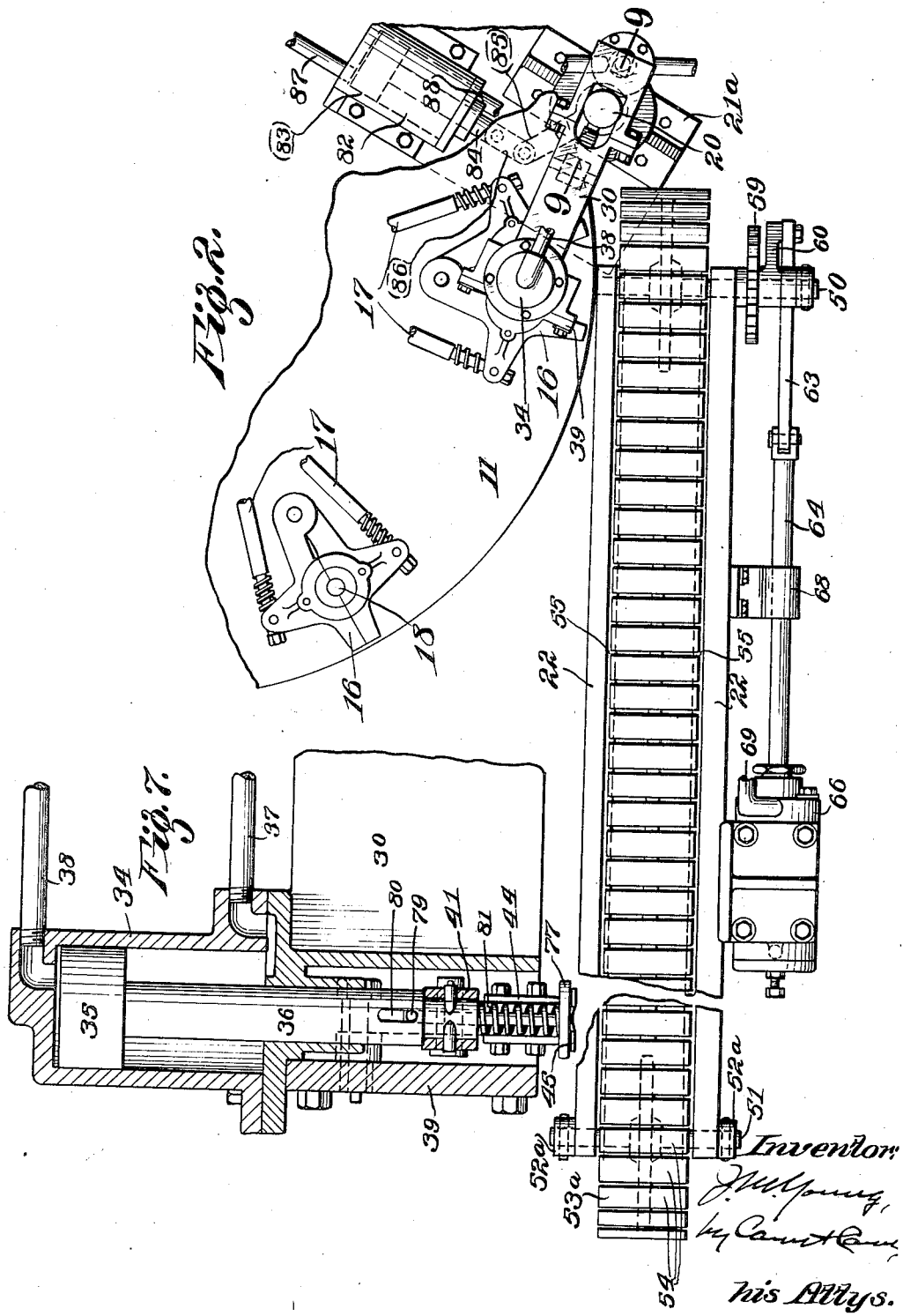

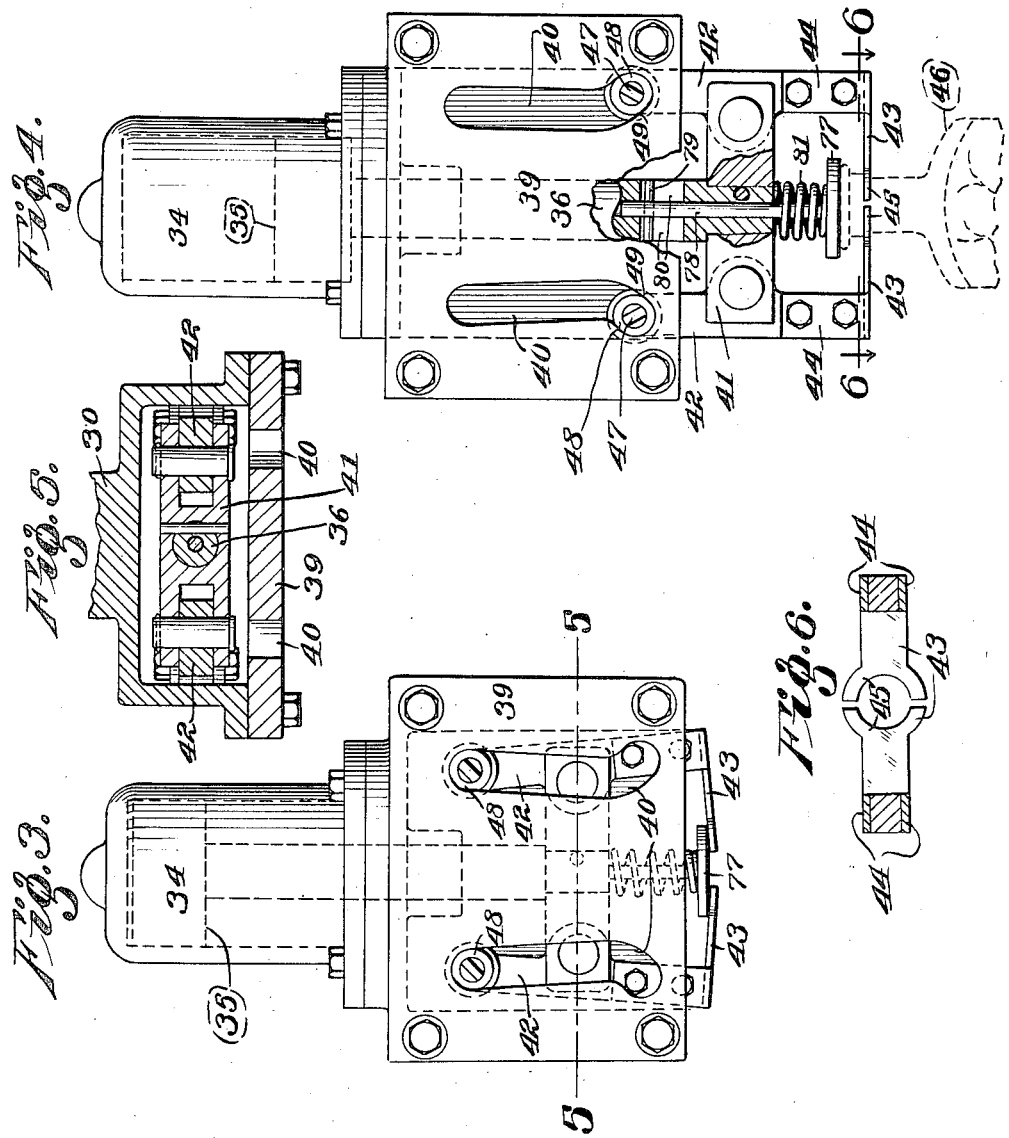

Patented June 12, 1923.                                                        1,458,456

UNITED STATES PATENT OFFICE.

JAMES M. YOUNG, OF ST. LOUIS, MISSOURI, ASSIGNOR TO OBEAR-NESTER GLASS COMPANY, OF ST. LOUIS, MISSOURI, A CORPORATION OF MISSOURI.

TAKE-OUT AND STEADYING DEVICE FOR GLASS-BLOWING MACHINES.

Application filed April 26, 1920.   Serial No. 376,649.

*To all whom it may concern:*

Be it known that I, JAMES M. YOUNG, a citizen of the United States, and a resident of the city of St. Louis and State of Missouri, have invented a new and useful Improvement in Take-Out and Steadying Devices for Glass-Blowing Machines, of which the following is a specification.

This invention relates principally to devices of the general type shown and described in my pending application Serial No. 336,821 filed November 10, 1919, for removing and conveying articles from automatic glass blowing machines of the general type shown in my pending application Serial No. 126,935 filed October 21, 1916, and is an improvement over the article removing mechanism shown in said first mentioned application.

The principal objects of the present invention are to simplify the construction and operation of the take-out mechanism and to provide a steadying device which will overcome the tendency of the articles to topple or fall over when engaged by said take-out device to remove the articles from the molds and when released by said device to deposit the articles upon the delivery device. The invention consists principally in the improved take-out and steadying means for glass blowing machines hereinafter set forth; and the invention further consists in the combinations and arrangements of parts hereinafter described and claimed.

In the accompanying drawings, the take-out and article steadying device embodying the preferred form of the invention is shown in connection with a machine for blowing the blank received from the blank-forming machine and a delivery device for conveying the said articles away. In said drawings, wherein like symbols refer to like parts wherever they occur, Fig. 1 is a side elevation of a combined take-out and article steadying device embodying my invention, the device being shown in connection with a blow-table of a bottle blowing machine and a delivery device for conveying the articles away, a bottle being shown lifted out of one of the open blow molds preparatory to being deposited upon the delivery device;

Fig. 2 is a top plan view of the combined take-out and article steadying device, a portion of the blow-table having two molds mounted thereon and delivery device being shown in connection therewith, the parts of the device being in the same position as that shown in Fig. 1;

Fig. 3 is a detail end view of the finger casing at the outer end of the cross-arm and the cylinder which raises and lowers the fingers, the fingers being shown in raised position and moved apart;

Fig. 4 is a view similar to Fig. 3, the finger being shown in lowered position and brought together around the neck of the bottle;

Fig. 5 is a horizontal section through the casing in which the bottle holding fingers are mounted, the section being taken through the cross head, which is operated by the finger operating cylinder, on the line 5—5 in Fig. 3;

Fig. 6 is a horizontal section taken through the bottle grasping fingers, the section being taken on the line 6—6 in Fig. 4;

Fig. 7 is a central vertical longitudinal section taken through the finger opening cylinder and finger casing; and Fig. 8 is a fragmentary vertical section through the pivotally mounted cross-arm on which the bottle grasping fingers are mounted, the section being taken through the rear end portion of the cross-arm and the cylinder for operating said arm on the line 9—9 in Fig. 2.

Referring to the accompanying drawings, 10 designates a base of any desired shape, which may be stationary or may be supported on wheels, (not shown) for convenience in handling. The take-out or article-removing device embodying the invention is shown in connection with the rotary final blow-table 11 of an automatic glass blowing machine of the type shown and claimed in my application Serial No. 126,935, filed October 21, 1916. In said machine, the blank or parison is formed in the blank molds of a rotary blank-table, after which said blank is automatically transferred to the blow-molds of the blow-table where it receives its final blowing. The blank-table, together with the mechanism for transferring the blank from the molds thereof to the molds of the final blow-table, forms no part of the present invention and, is therefore, not shown in the accompanying drawings.

The blow-table 11 has a cylindrical hub portion 12 which is rotatably mounted on ball bearings 13 in a pedestal 14. The pedestal 14 is bolted or otherwise secured to the base 10 and the cylindrical portion 12 of the blow-table 11 is provided with a ring gear 15 which is intermittently driven by any suitable means. The blow or finishing molds 16, which may be of any desired number, are mounted on the blow-table and comprise two vertically hinged half sections connected by a hinge-pin so as to swing open and shut. The two half sections are provided with registering cavities of the shape desired to be imparted to the finished bottle and are automatically opened and closed by drag links 17, which are preferably operated by a suitable cam means (not shown). The blow molds are also provided at their tops with openings 18 which register with a stationary blow head (not shown) in one of the stationary portions, wherein the bottle blank receives its final blowing.

The delivery device illustrated in the accompanying drawings is described and claimed in my pending application Serial No. 336,821 filed November 10, 1919 and comprises a pair of horizontally disposed spaced channel irons 22 which form the longitudinal side rails of an endless chain conveyer. The spaced channel iron side rails 22 of the conveyer are arranged alongside of the blow-table with their web portions disposed vertically and with their top flanges slightly above the top of the blow-table 11. The spaced channel iron side rails are supported near each end by standards 23 which are bolted to the base 10 and bottom flange of the side rails 22. Mounted on horizontal shafts 50 and 51 journaled in bearings 52, which are secured to the under side of the side rails 22 at the respective front and rear ends of the conveyer, are sprocket wheels 53. These sprocket wheels are located midway between the side rails of the conveyer frame and the shafts 50 and 51 are prevented from slipping endwise of the bearings by means of collars 52ª. These sprocket wheels support an endless conveyer chain 53ª which is made up of links having portions adapted to be engaged by the teeth of the sprocket wheels and having laterally extending portions in the form of flights 54 which travel between the side rails of the conveyer. The tilting or sagging of the flights 54 in the upper portion of the chain is prevented by means of metal strips 55, which are riveted to the under side of the top flanges of the side rails, and project inwardly far enough past the outer ends of the flights to support the same. The sagging of the lower portion of the conveyer chain between the sprocket wheels is prevented by means of idler rollers 56 which are journaled in the bearing 57 bolted to the under sides of the side rails of the conveyer frame.

A ratchet wheel 59 is secured to the shaft 50 at the forward end of the conveyer outside of the outside rail of the conveyer frame. A ratchet arm 60, having a hub portion loosely sleeved on the shaft 50, is located outside of the ratchet wheel. This ratchet arm has a pawl 61 pivotally mounted thereon whose free end portions engage the teeth of the ratchet wheel. The outer end of the pawl is held in engagement with the teeth of the ratchet wheel by means of a coil spring 62, one end of which is secured to the ratchet arm and the other end of which is secured to the free end of the pawl. The outer free end of the ratchet arm 60 is provided with an elongated slot 61ª, which is widened out beneath the surface of the arm to receive the head of a T-bolt 62ª, which is slidably arranged therein. The shank portion of the bolt 62ª projects outwardly beyond the slot 61ª and extends through a hole in one end of a link 63. A nut is threaded on the outer end of the bolt for clamping the bolt in any desired position in the slot 61ª formed in the ratchet arm 60.

The other end of the link 63 is pivotally secured between the bifurcated outer end portions of a horizontally arranged piston rod 64 having a piston 65 working in a horizontally disposed cylinder 66. This cylinder operates the sprocket rotating mechanism hereinbefore described and is supported from the conveyer frame by means of a bracket 67, which is bolted or otherwise secured to the outside face of the outermost rail 22 of the conveyer frame. This piston rod, due to its length, is supported midway between its ends by means of an additional bearing 68 which is bolted to the side face of the standard 23 which supports the forward end of the conveyer frame. A pipe 69 leads to the head (right hand) end of the cylinder 66 for throwing the piston 65 to the left, and another pipe 70 leads to the rear (left hand) end of the cylinder for throwing the piston forward. The forward sprocket constitutes the drive sprocket, while the sprocket at the delivery end of the conveyer simply supports the conveyer shown and is nothing more than an idler. With the arrangement described, when the piston 65 is thrown forward in the cylinder 66 (as shown in Fig. 1) the ratchet arm 60 is swung forward by the piston rod 64 and the pawl 61 pivoted on said ratchet arm engages the teeth of the ratchet wheel 57, thereby partially rotating said ratchet wheel and causing the conveyer chain to move towards the delivery end of the conveyer; and when the piston 65 is thrown backward in the cylinder, the pawl 61 slides over to the teeth of the ratchet wheel 57 and the conveyer chain remains stationary.

The take-out or bottle removing mechanism comprises an upright rock-shaft 20 journaled for rotation in the upper and lower bearings of an upright standard 21 whose base flange 21ᵃ is bolted or otherwise secured to the base 10. Mounted on the upper end of the upright shaft 20, and arranged for vertical adjustment thereon, is a cross-arm support 19. This vertical adjustment is accomplished by means of a rack 31, which is set in a vertical groove in the upright shaft 20. This rack is engaged by a pinion 32 fixed to a shaft journaled in the supporting member 19. This shaft, when turned, causes the pinion 32 to move along the rack 31 and force the supporting member 19 to travel up and down on the upright shaft 20. The supporting member may be locked in the desired adjusted position on the upright shaft in any desired manner, for instance, by means of a cap-screw 33, which is adapted to engage the teeth of the pinion 32 to prevent rotation of the same.

A horizontally disposed cross-arm 30 has its middle portion fulcrumed on a pin 24, which is supported in the upper end of an upwardly projecting arm 25 of the supporting member 19. This cross-arm is inverted channel shaped in cross section, and its web portion is arranged uppermost and is provided with an elongated vertical slot or opening 26 extending lengthwise thereof through which the upper end of the shaft 20 projects. The upwardly projecting arm 25 of the supporting member extends between the depending side flanges of the cross-arm, and the pin 24 extends through alined horizonal holes in the side flanges of the cross-arm and upwardly projecting arm of the supporting member, thereby permitting vertical swinging movement at the opposite ends of the cross-arm. The rear end of the cross-arm is raised and lowered, to raise and lower the forward end thereof, by means of a piston 27. This piston works in a cylindrical bore 28 in the cross-arm support 19. This bore extends upwardly from the bottom of the cross-arm support and its lower end is closed by means of a plate 29. The piston is provided with a piston rod 27ᵃ which extends upwardly from the supporting member 19 between the side flanges of the cross-arm 30. The upper end of the piston rod is reduced to fit between the bifurcated lower end portion of a vertically disposed link 71 and the link and piston rod are secured together by means of a pin 72. The link 71 is arranged between the spaced side flanges of the supporting member 19 and its upper end is pivotally mounted on a horizontally disposed pin 73 which is arranged crosswise of the cross-arm and extends through alined holes in the side flanges of the cross-arm and the upper end of the link 71. Air is supplied to the lower end of the cylindrical bore 28 for raising the piston 27 to raise the rear end of the cross-arm 30 and lower the front end thereof by means of a pipe 75 which communicates with the passage 76 in the plate 29 that covers the lower end of the cylindrical bore. Air is supplied to the upper end of the cylindrical bore 28 for driving down the piston 27 to lower the rear end of the cross-arm 30 and raise the front end thereof by means of a pipe 74.

Mounted on the upper portion of the cross-arm, on the outer free end thereof, is a finger operating cylinder 34, which is provided with a piston 35 having a piston rod 36 extending downwardly from the cylinder 34. Air is supplied to the lower end of the cylinder 34 for raising the piston 35 by means of a pipe 37. Air is supplied to the top of the cylinder 34 for driving down the piston 35 by means of a pipe 38.

The outer end of the cross-arm 30 widens out and is provided with a recess which is closed by a cover plate 39 having a pair of spaced vertical cam slots 40 cut therein. The piston rod 36 passes through a boss in the top of the recess formed in the outer end of the cross-arm, and extends into said recess and has a horizontally arranged cross head 41 secured to its lower end. This cross head has its opposite end portions bifurcated, and pivotally mounted between its bifurcated end portions are finger lever arms 42. Attached to the lower ends of the finger arms are oppositely disposed bottle grasping fingers 43, which are preferably shown in the form of flat plates made of spring metal, and have tabs 44 bent up on each side of the finger arms 42 and bolted or otherwise secured thereto. The fingers 43 have oppositely disposed concave or incurved end portions 45 adapted to engage the neck of the bottles 46 on opposite sides thereof. The upper ends of the finger arms 42 are provided with studs 47 which project through the respective cam slots 40 in the cover plate 39 and have rollers 48 journaled thereon which fit in the cam slots. The lower portions of the cam slots 40 are curved outwardly away from each other as at 49 and are for the purpose of opening and closing the bottle grasping finger 43. Thus when the piston 35 is in its uppermost position in the cylinder 34, the rollers on the pivoted finger arms are thrown up into the straight portions of the cam slots 40 causing the upper ends of the finger arms 42 to be brought together and thus causing the lower portions to be spread apart and the fingers 43 to separate. When the piston 35 is in its lowermost position in the cylinder 34, the rollers 48 at the upper ends of the finger arms 42 are drawn into the outwardly curved lower portions 49 of the cam slots 40 and thus cause the fingers 43 attached to the lower ends of the finger arms 42 to be brought together.

The forward end of the cross-arm 30 is provided with means for steadying the bottles to prevent them from toppling or falling over when engaged by the bottle grasping fingers to remove the bottles from the molds and when the bottles are released by the bottle grasping fingers to deposit the bottles upon the conveyer. This steadying means comprises a circular plate or disk 77 having a vertical stem portion 78 which is slidably mounted in a vertical bore in the lower end of the piston rod 36. Near its upper end, the stem portion is provided with a cross-pin 79 whose opposite ends extend into elongated vertical slots 80 provided therefor in the piston rod whereby sliding movement of the stem portion in the vertical bore of the piston rod is permitted, but said stem portion is retained therein by the cross-pin 79. The stem portion of the steadying device is normally held with its lower surface in contact with the bottle grasping fingers 43 by means of a coil spring 81. This spring is sleeved on the stem 78 of the steadying disk 77 with its respective upper and lower ends bearing against the under surface of the cross-head 41 and the upper surface of the disk 77 of the steadying device.

The upright shaft 20 is partially rotated to swing the cross-arm 30 from its normal position with the bottle grasping fingers over a mold 16 by means of a horizontally disposed cylinder 82. This cylinder is secured to the base 10 and has a piston 83 working therein, the piston rod 84 of which extends through the front end of the cylinder and is connected to a rock-arm 85, which is fixed to the lower end of the rock-shaft 20, by means of a link 86. A pipe 87 leads to the rear end of the cylinder 82 for admitting air in back of the piston 83 to drive said piston forward in the cylinder and rotate the shaft 20 in an anti-clockwise direction and swing the cross-arm from its normal position over a mold to a position over the conveyer. Another pipe 88 leads to the forward end of the cylinder for admitting air in front of the piston to drive the piston to the rear of the cylinder and rotate the shaft 20 to return the cross-arm to its normal position over the mold.

The rotatable blow mold table 11 shown in the drawings is adapted to support six of the molds 16, two of which are shown in Fig. 1, one being shown closed and the other being shown in open position beneath the bottle grasping fingers 43 at the outer end of the cross-arm 30. The table is automatically rotated intermittently sixty degrees towards the right, and its position with respect to the bottle grasping fingers is such that an open mold containing a finished bottle is located directly beneath the bottle grasping fingers at the end of each sixty degree rotation of the blow-table.

The parts of the machine, except the cross-arm 30 and the bottle grasping fingers 43 at the outer end thereof, are shown in their normal positions, and it will be noted that the proper time intervals between the various working parts and the sequence of their operation are all controlled by suitable control valves (not shown) to which the pipes leading to the different operating cylinders are connected.

Assuming the various working parts of the device to be in normal position, the operation of the device is as follows: The blow-table, at the beginning of the bottle removing operation, is in its stationary position with an open mold containing a completed bottle positioned directly below the bottle grasping fingers at the end of the cross-arm, which in its normal position is disposed horizontally and overhangs an open mold. Air is then admitted to the pipe 38 which leads to the top of the finger operating cylinder 34, thus forcing the piston 35 downwardly and causing the disk 77 which is slidably mounted in the piston rod 36, to engage the top of the bottle and steady the same, after which the bottle grasping fingers, by reason of the curvature of the cam slots 40 in the cover plate 39, are brought together and close around the neck of the bottle.

Air is then admitted to the pipe 74 leading to the upper end cylindrical bore 28 in the supporting member 19 and the piston therein is forced downwardly, thus lowering the rear end of the cross-arm 30. This action raises the front end of the cross-arm and lifts the bottle clear of the annular recess in the bottom plate of the mold.

Air is then admitted to the pipe 87 leading to the rear end of the cylinder 82 and drives the piston therein forward. This action, by reason of the link connection between the forward end of the piston rod 84 and the rock-arm 85 fixed to the lower end of the rock shaft, rotates the rock shaft 20 far enough to swing the outer end of the cross-arm 30 over the conveyer with the bottle suspended above the flights thereof.

Air is then admitted to the lower end of the finger operating cylinder 34 and drives the piston therein upward. This action, by reason of the abrupt curves at the bottoms of the cam slides 40, causes the fingers 43 to separate quickly as said fingers begin their upward movement and release the bottle, thereby permitting the same to drop upon the flights of the conveyer chain. Any tendency of the bottle to fall over upon being dropped onto the conveyer chain is avoided by means of the spring pressed steadying disk 77. Upon release of the bottle by the bottle grasping fingers, the bottle is dropped a short distance to the flights of the conveyer chain. During the descent of the bottle, the engagement of the steadying disk 77 with the top of the bottle is maintained by reason of the spring 81 which forces the disk downwardly and permits the disk to follow the bottle in its descent and maintain this pressure thereon for a short period after the bottle strikes the conveyer chain, thus preventing the bottle from toppling or falling over. This downward movement of the steadying disk during the upward movement of the finger operating piston is permitted by reason of the slot and pin connection between the stem portion 78 of the steadying disk and the piston rod 36 of the finger operating piston 35. This slot and pin arrangemnt permits the bottle steadying disk to bear against the top of the bottle after the release thereof by the bottle grasping fingers a length of time sufficient to steady the bottle before the disk is lifted off the bottle by the upwardly moving piston rod 36.

Air is then admitted to the rear end of the cylinder 66 through the pipe 70 and throws the piston 65 forward. This forward movement of the piston 65 causes the conveyer chain to travel a short distance towards the delivery end of the conveyer and thus moves the bottle just deposited thereon out of the path of the next bottle to be swung into position over the conveyer chain. Simultaneous with the rearward movement of the conveyer chain, air is admitted through the pipe 74 leading to the lower end of the cylinder 28 and drives the piston 27 therein upwardly. This action, by reason of the link connection 71 between the piston rod 27ª of the piston 27 and the rear end of the cross-arm 30 raises the rear end of the cross-arm and causes the cross-arm to turn on its fulcrum pin 24 and lower its front end to its normal position. This completes the cycle of operation, and all of the parts having returned to the normal positions, the hereinbefore described operation is repeated.

It is noted that the take-out or transfer device is adjustable for handling glass articles of different heights by reason of the rack and pinion connection between the supporting member 19 which pivotally supports the cross-arm 30 and the upright rockshaft 20.

The bottle blowing machine, together with the delivery device for conveying the bottles away after the same are removed from said bottle blowing machine, are shown only as examples and the invention is not limited thereto as the take-out and steadying device is equally adapted for use in connection with other types of bottle blowing machines and delivery devices.

The invention is not restricted to the details of construction and arrangement of parts shown and described.

What I claim is:

1. In a glass blowing machine, the combination of a mold, a take-out mechanism comprising a pivotally mounted cross-arm, means on said cross-arm for engaging an article in said mold, means for rocking said cross-arm to lift the article from said mold, and means for steadying the article prior to its engagement by said article engaging means.

2. In a glass blowing machine, the combination of a mold, a take-out mechanism comprising a cross-arm arranged for vertical and horizontal swinging movement, means on said cross-arm for engaging an article in said mold, means for rocking said cross-arm vertically to lift the article from said mold, means for swinging said cross-arm horizontally to swing the article clear of the mold, and means on said cross-arm for steadying the article in the mold during its engagement by said article engaging means and after its release thereby.

3. In a glass blowing machine, the combination of a mold, a take-out mechanism comprising an upright shaft, a lever pivotally supported between its ends on said upright shaft to swing vertically, means mounted on one arm of said lever for engaging an article in said mold, means cooperating with the other arm of said lever for rocking said lever to lift the article from said mold, and means for rotating said upright shaft to swing said lever and the article engaging means thereon clear of the mold.

4. In a glass blowing machine, the combination of a mold, a take-out mechanism comprising an upright shaft, a supporting member adjustably mounted thereon, a cross-arm pivotally supported on said upright supporting member to swing vertically, means mounted on one end of said cross-arm for engaging an article in said mold, means for rocking said cross-arm to raise the article engaging means thereon to lift the article from said mold, means for rotating said upright shaft to swing said cross-arm and the article engaging means thereon clear of the mold, and means on said cross-arm for steadying the article in said mold prior to and during its engagement by said article engaging means and after its release thereby.

5. In a glass blowing machine, the combination of a movably mounted mold, an article take-out and steadying device comprising a cross-arm fulcrumed on a horizontal axis to swing vertically, article grasping fingers pivotally mounted on said cross-arm, means for closing said fingers to engage an article in said mold and for opening said fingers to release said article, means for rocking said cross-arm to lift the article from said mold after said fingers engage said article, and means for steadying the article in said mold prior to its engagement by said fingers and after its release thereby.

6. In a glass blowing machine, the combination of a movably mounted mold, an article take-out and steadying device comprising a cross-arm fulcrumed on a horizontal axis to swing vertically, article grasping fingers pivotally mounted on said cross arm, means for closing said fingers to engage an article in said mold and for opening said fingers to release said article, means for rocking said cross-arm to lift the article from said mold after said fingers engage said article, and means for steadying the article before and after being engaged by said article grasping fingers, said means comprising a movably mounted spring pressed member adapted to bear on the article, the engagement of said plate with the article occurring prior to the engagement of said article by said fingers and terminating after its release thereby.

7. In a glass blowing machine, the combination of a movably supported mold, an article take-out and steadying device comprising a cross-arm fulcrumed to swing vertically and horizontally, article grasping fingers movably mounted on said cross-arm and adapted to engage an article in said mold, means for lowering said fingers to engage said article, means for swinging said cross-arm vertically to lift the article from said mold, means for swinging said cross-arm horizontally to carry the article clear of the mold, and means for steadying the article before being engaged by said article grasping fingers and after being released thereby, said means comprising a spring pressed plate adapted to bear on the article before its engagement by said fingers and after its release thereby.

8. In a glass blowing machine, the combination of a movably supported mold, an article take-out mechanism comprising an upright shaft, a lever pivotally mounted between its ends on said shaft to swing vertically and arranged with one arm overhanging a mold, fingers mounted on said arm and adapted to engage an article in said mold, means cooperating with the other arm of said lever for rocking said lever to lift the article from the mold, and means for rotating said rock shaft to swing said lever and carry the article clear of the mold.

9. In a glass blowing machine, the combination of a movably supported mold, a take-out mechanism comprising an upright rock shaft, a supporting member mounted on said rock shaft and arranged for vertical adjustment thereon, a cross-arm pivotally supported on said supporting member to swing vertically, a piston mounted on one end of said cross-arm and having a piston rod provided with a cross-head, article grasping fingers pivotally mounted on said cross-head, said cross-arm having cam slots engaged by said fingers whereby movement of the piston in one direction will cause the engagement of an article in said mold and movement in the opposite direction will cause the fingers to release said article, a piston mounted on the said supporting member for rocking said cross-arm to lift the article from the mold, a piston for partially rotating said upright shaft to swing the cross-arm and carry the article clear of the mold, and means yieldably attached to the piston rod of the finger operating cylinder for steadying the article prior to its engagement by said fingers and after its release thereby.

10. In a glass blowing machine, the combination of a movably mounted mold, a take-out mechanism comprising a cross-arm, a vertically movable member mounted on said cross-arm, article grasping fingers mounted on said cross-arm, said cross-arm being arranged for vertical and horizontal swinging movement to lift the article from the mold and swing the same clear thereof, means on said cross-arm for actuating said fingers to cause the same to engage an article in said mold and release said article after its removal therefrom, and an article steadying device comprising a plate having a stem portion slidably mounted in said movable member, said plate being adapted to bear on the article in said mold prior to its engagement by said fingers and after its release thereby.

11. In a glass blowing machine, the combination of a movably mounted mold and a device for conveying articles removed therefrom, a take-out mechanism for removing an article from said mold and depositing said article upon said conveying device, and means for steadying the article in said mold prior to its engagement by said take-out to remove the article from the mold and after said mechanism has deposited the article on said conveying device.

Signed at St. Louis, Missouri, this 23rd day of April, 1920.

JAMES M. YOUNG.